Dec. 22, 1959   C. D. BRANSON   2,917,925
THERMOSTATIC DEVICES
Filed May 16, 1957

INVENTOR.
Charles D. Branson.
BY
His Attorney.

United States Patent Office 2,917,925
Patented Dec. 22, 1959

2,917,925

THERMOSTATIC DEVICES

Charles D. Branson, Irwin, Pa., assignor to Robertshaw-Fulton Controls Company, Richmond, Va., a corporation of Delaware Application May 16, 1957, Serial No. 659,573

10 Claims. (Cl. 73—368.3)

This invention relates to thermostatic devices and more particularly to pressure insensitive thermal elements.

Devices of this type usually embody a charging material which undergoes a change of state, such as solid to liquid, with accompanying expansion. The expansion of the charge is transmitted through an elastic transmission to an actuating plunger which is forced to its actuating position. Some difficulty has been experienced in the use of these devices under conditions where ambient fluid may become entrapped between the parts. This may cause a change in the temperature calibration of the thermal element in excess of any allowable amount.

An object of this invention is to prevent trapping of ambient fluids between the operating parts of a pressure insensitive thermal element.

Another object of the invention is to maintain the temperature calibration under normal usage and particularly in locations where the element is wholly immersed in fluid.

Another object of the invention is to eliminate the described difficulty without involving extensive changes in the parts or creating manufacturing problems.

These and other objects and advantages of the invention are accomplished by utilizing an oversize elastic plug having sealing means at one end which, when confined under pressure in a housing, will serve to seal the inner wall of the housing against leakage of ambient fluids. In order to prevent entrapment of fluid beneath the inner end of the actuating plunger when the plug is distorted from expansion of the charge, a venting means is employed. This means takes the form of an axial opening in the plug having a portion of restricted diameter adjacent the part of the plug where the fluid may be trapped. The axial opening serves as a vent, while the restriced diameter portion prevents extrusion of the elastic plug into the opening and serves to maintain the vent in operation condition.

Figure 1:
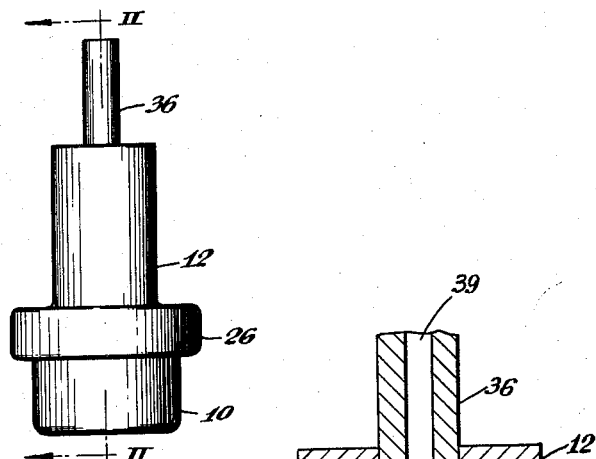
Fig. 1 is a front elevation of a pressure insensitive thermal element embodying the invention.
Figure 2:
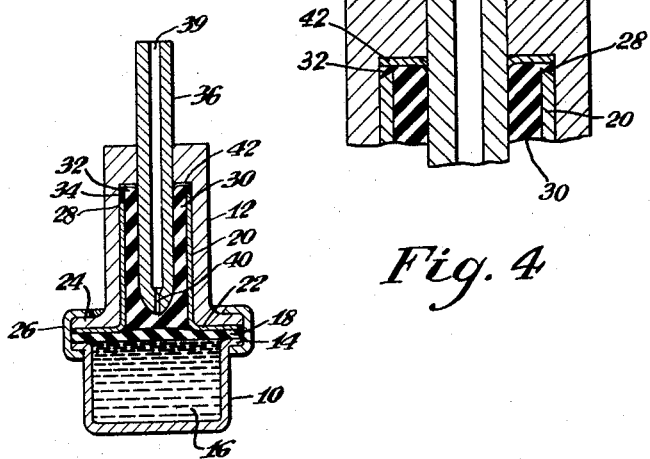
Fig. 2 is a longitudinal section taken along the line II—II of Fig. 1.
Figure 4:
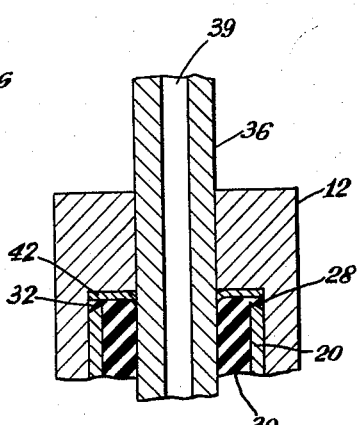
Fig. 4 is an enlarged sectional view of a detail.

Referring more particularly to the drawing, the thermal element comprises a pair of cup-shaped housings 10 and 12, respectively, having their open ends positioned in overlying relation. The housing 10 is provided with a flange 14 at its open end and is filled with a charging material, such as a hydrocarbon wax 16, which changes from a solid to a liquid at a pre-selected temperature with accompanying expansion. It will be apparent that other materials having the change of state characteristics required may be substituted and that the invention is not limited to the particular material described. The flange 14 supports an elastic diaphragm element 18 which closes the open end of the housing 10 and is adapted to be moved partially into the other housing 12 upon expansion of the charge 16 as will later be apparent. A tubular member in the form of a sleeve 20 engages the inner wall of the housing 12 and is provided with an annular flange 22 which is seated upon the diaphragm 18 leaving the center portion thereof free. The housing 12 is also provided with an annular flange 24 which conforms to the contour of the sleeve flange 22 which it overlies. The two housings 10 and 12 are secured together, with the diaphragm 18 and the sleeve 20 therebetween, by clamping means in the form of a ferrule 26 which is crimped, spun or otherwise secured in engagement with the flanges 14 and 24, respectively.

The sleeve member 20 terminates short of the inner wall of the housing 12 and has a chamfered end face 28 for a purpose apparent hereinafter. An apertured plug 30 of elastic material, such as rubber, extends into the sleeve 20 and operatively engages the diaphragm element 18. The plug member 30 is preferably made of oversize dimensions compared with the sleeve 20 and is thereby confined under pressure therein. Means are provided for sealing the inner wall of the housing 12 against leakage, such means being cooperable with the sleeve 20. To this end, an annular flange portion 32 is carried by the plug member 30 overlying the chamfered end 28 of the sleeve 20 and operatively engaging the inner wall of the housing 12. The flange portion 32 has a chamfered end face 34 which is complemental with the chamfered end face 28 of the tubular member or sleeve 20. As will be apparent, the chamfered surfaces 28 and 34 form an annular dove-tail joint face which serves to extrude the flange 32 into sealing engagement with the inner wall of the housing 12.

Figure 3:
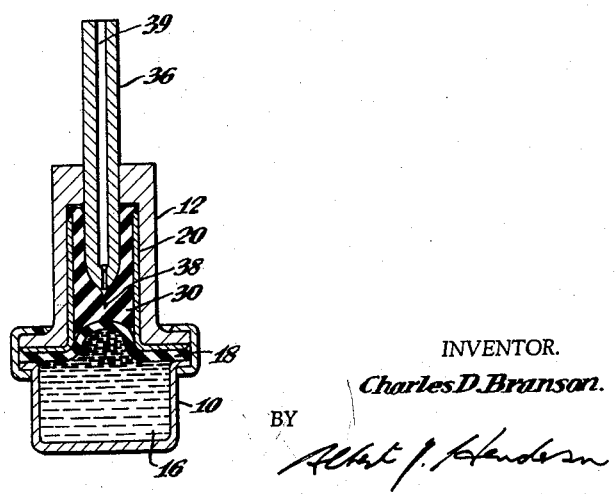
Fig. 3 is a longitudinal section similar to Fig. 2 but showing the parts in another position.

An actuating stem in the form of a plunger 36 is carried in the apertured plug 30 and normally fills the aperture when the thermal element is below a pre-selected temperature sufficient to change the state of the filling material 16. In the normal operation of such devices, the plunger 36 is reciprocable relative to the housing 12 and projects therefrom into engagement with a device (not shown) to be actuated. Such operation occurs upon expansion of the charge 16 at a pre-selected temperature sufficient to change it from a solid to a liquid state. Upon expansion of the charge 16, the diaphragm element 18 becomes extruded into the housing 12 at its central portion and adopts the position substantially as shown in Fig. 3. The plunger 36 is reciprocated relative to the housing 12 since the diaphragm movement causes a portion of the plug member 30 to distort and substantially close the portion of its aperture beneath the plunger 36. Such operation leaves merely a minute opening or crack, indicated at 38 in Fig. 3, on the center line of the plug member 30 and extending toward the diaphragm element 18 from beneath the plunger 36.

It is apparent that in installations where the pressure insensitive thermal element is wholly immersed in the liquid, such as water, alcohol or ethylene glycol, it may be possible for some of the liquid to leak past the plunger 36 and become entrapped beneath the plunger 36 by the surrounding elastic material of the plug member 30. Consequently, such fluid cannot escape when the charge 16 expands and effectively increases the length of the plunger 36 at any given temperature. The thermal element is thus caused to operate the actuated device (not shown) at too low a temperature which may be as much as 15° F. and far in excess of any allowable amount.

Means for venting the portion of the aperture in the plug member 30 beneath the plunger 36 takes the form of an axial opening 39 formed in the plunger 36 and communicating with the aperture 38 therebeneath. In order that the elastic material of which the plug member 30 is composed be not extruded into the opening 39 under expanded conditions and under load, the opening 39 terminates in a section 40 of restricted diameter adjacent the inner end thereof where the distortion of the plug member 30 occurs. Such restricted diameter opening 40 may be formed by partially closing the end of the opening 39 by spinning or other suitable operation or by forming the opening 38 of smaller diameter at the described location. The restricted diameter opening 40 should, however, be on or closely proximate the axis of the plunger 36 and of a limited size, approximately .020″ in diameter. It is apparent that the limited size and location of the restricted diameter opening 40 are conditioned upon the prevention of the extrusion of the elastic material of the plug member 30 into the opening 39. As indicated in Fig. 3, when the charge 16 is undergoing expansion, the crack 38 remaining in the plug member 30 after the aperture beneath the plunger 36 is closed, will be aligned with the restricted diameter opening 40. Such alignment leaves the axial openings 39 and 40 free to receive any fluid from beneath the plunger 36. Hence, such fluid can escape from the projecting end of the plunger 36 without changing the relative location of the plunger 36 and the housing 12. If desired, and in order to facilitate axial movement of the plunger 36, a washer 42 of nylon or some other anti-friction material may be carried between the flanged end 32 of the plug member 30 and the bottom of the cup-shaped housing 12. The inner wall of such washer 42 may closely engage the plunger 36 for the purpose described.

It will be apparent that many changes may be made in the details of construction and arrangement of parts without departing from the scope of this invention as defined in the appended claims.

I claim:

1. A pressure insensitive thermal element comprising a pair of cup-shaped housings having oppositely disposed open ends in overlying relation, a filling material in one of said housings adapted to undergo a change of state and consequent expansion upon variations in temperature affecting said material, an elastic diaphragm positioned between said open ends and movable partially into the other said housing upon said expansion, an apertured plug of elastic material confined within said other housing and operatively engageable with said diaphragm, an actuating stem normally filling the aperture in said plug and reciprocable relative to said other housing upon said diaphragm movement causing a portion of said plug to distort and substantially close the portion of said aperture beneath the inner end face of said stem, and venting means positioned at said inner end face of said stem and cooperable with said plug upon said distortion thereof for preventing entrapment of fluid in said aperture portion.

2. A pressure insensitive thermal element as claimed in claim 1 wherein said venting means includes an axial opening in said inner end face of said plug communicating with said aperture portion.

3. A pressure insensitive thermal element as claimed in claim 2 wherein said opening terminates in a section of restricted diameter at said inner end face of said plug adjacent said aperture portion.

4. A pressure insensitive thermal element as claimed in claim 3 wherein said restricted diameter is approximately .020 inch.

5. A pressure insensitive thermal element comprising a pair of cup-shaped housings having oppositely disposed open ends in overlying relation, a filling material in one of said housings adapted to undergo a change of state and consequent expansion upon variations in temperature affecting said material, an elastic diaphragm positioned between said open ends and movable partially into the other said housing upon said expansion, an apertured plug of elastic material confined within said other housing and having one end operatively engageable with said diaphragm, an actuating stem normally filling the aperture in said plug and reciprocable relative to said other housing upon said diaphragm movement, a tubular member interposed between the outer wall of said plug and the inner wall of said other housing and extending from said one end and terminating short of the other end of said plug, and means carried by said other end of said plug and cooperable with said short end of said tubular member for sealing said inner wall against leakage thereby.

6. A pressure insensitive thermal element as claimed in claim 5 wherein the last said means comprises an annular flange portion adapted to closely engage said inner wall and be supported in such engagement by said short end of said tubular member.

7. A pressure insensitive thermal element as claimed in claim 6 wherein said flange and said short end of said tubular member have complemental dovetail surfaces.

8. A pressure insensitive thermal element comprising a pair of cup-shaped housings having oppositely disposed open ends in overlying relation, a filling material in one of said housings adapted to undergo a change of state and consequent expansion upon variations in temperature affecting said material, an elastic diaphragm positioned between said open ends and movable partially into the other said housing upon said expansion, an apertured plug of elastic material positioned within said other housing and having one end operatively engageable with said diaphragm, means for clamping said housings together and securing said diaphragm therebetween, said plug being dimensioned oversize and thereby confined under pressure in said other housing, an actuating stem normally filling the aperture in said plug and reciprocable relative to said other housing upon said diaphragm movement, a tubular member interposed between the outer wall of said plug and the inner wall of said other housing and extending from said one end and terminating short of the other end of said plug, and an annular flange portion carried by said other end of said plug in overlying relation to said short end of said tubular member, said flange portion being effective under said pressure for sealing said inner wall against leakage thereby.

9. A pressure insensitive thermal element comprising a pair of cup-shaped housings having oppositely disposed open ends in overlying relation, a filling material in one of said housings adapted to undergo a change of state and consequent expansion upon variations in temperature affecting said material, an elastic diaphragm positioned between said open ends and movable partially into the other said housing upon said expansion, an apertured plug of elastic material positioned within said other housing and having one end operatively engageable with said diaphragm, means for clamping said housings together and securing said diaphragm therebetween, said plug being dimensioned oversize and thereby confined under pressure in said other housing, an actuating stem normally filling the aperture in said plug and reciprocable relative to said other housing upon said diaphragm movement causing a portion of said plug to distort and substantially close the portion of said aperture beneath the inner face of said stem, a tubular member interposed between the outer wall of said plug and the inner wall of said other housing and extending from said one end and terminating short of the other end of said plug, an annular flange portion carried by said other end of said plug in overlying relation to said short end of said tubular member, said flange portion being effective under said pressure for sealing said inner wall against leakage thereby, and venting means positioned at said inner end face of said stem and cooperable with said plug upon said distortion thereof for preventing entrapment of fluid in said aperture portion.

10. A pressure insensitive thermal element comprising a pair of cup-shaped housings having oppositely disposed open ends in overlying relation, a filling material in one of said housings adapted to undergo a change of state and consequent expansion upon variations in temperature affecting said material, an elastic diaphragm positioned between said open ends and movable partially into the other said housing upon said expansion, an apertured plug of elastic material positioned within said other housing and having one end operatively engageable with said diaphragm, means for clamping said housings together and securing said diaphragm therebetween, said plug being dimensioned oversize and thereby confined under pressure in said other housing, an actuating stem normally filling the aperture in said plug and reciprocable relative to said other housing upon said diaphragm movement causing a portion of said plug to distort and substantially close the portion of said aperture beneath the inner end face of said stem, a tubular member interposed between the outer wall of said plug and the inner wall of said other housing and extending from said one end and terminating short of the other end of said plug, an annular flange portion carried by said other end of said plug in overlying relation to said short end of said tubular member, said flange portion being effective under said pressure for sealing said inner wall against leakage thereby, and venting means for said aperture portion including an axial opening in said plug terminating adjacent said aperture portion in a section of restricted diameter at said inner end face of said plug, said diameter being approximately .020 inch.

References Cited in the file of this patent

UNITED STATES PATENTS

| | | |
|---|---|---|
| 1,989,897 | Anderson et al. | Feb. 5, 1935 |
| 2,326,096 | Dillman | Aug. 3, 1943 |
| 2,636,776 | Vernet | Apr. 28, 1953 |
| 2,657,711 | Dillman | Nov. 3, 1953 |